US009519903B2

(12) United States Patent
Kannan et al.

(10) Patent No.: US 9,519,903 B2
(45) Date of Patent: Dec. 13, 2016

(54) METHOD AND APPARATUS FOR PROACTIVE NOTIFICATIONS BASED ON THE LOCATION OF A USER

(71) Applicant: 24/7 CUSTOMER, INC., Campbell, CA (US)

(72) Inventors: Pallipuram V. Kannan, Los Gatos, CA (US); A. Kranthi Mitra, Hyderabad (IN); Santhosh Kumar Arjunan, Tamil Nadu (IN)

(73) Assignee: 24/7 CUSTOMER, INC., Campbell, CA (US)

( * ) Notice: Subject to any disclaimer, the term of this patent is extended or adjusted under 35 U.S.C. 154(b) by 58 days.

(21) Appl. No.: 13/973,776

(22) Filed: Aug. 22, 2013

(65) Prior Publication Data

US 2014/0067649 A1    Mar. 6, 2014

Related U.S. Application Data

(60) Provisional application No. 61/694,451, filed on Aug. 29, 2012.

(51) Int. Cl.
| | |
|---|---|
| *G06Q 40/00* | (2012.01) |
| *G06Q 30/00* | (2012.01) |
| *H04L 12/26* | (2006.01) |
| *H04L 29/08* | (2006.01) |
| *H04W 4/02* | (2009.01) |
| *H04W 4/20* | (2009.01) |
| *G06Q 30/02* | (2012.01) |
| *G06Q 20/32* | (2012.01) |
| *G06F 21/55* | (2013.01) |

(52) U.S. Cl.
CPC .......... *G06Q 30/01* (2013.01); *G06Q 20/3224* (2013.01); *G06Q 30/0261* (2013.01); *H04L 43/04* (2013.01); *H04L 67/18* (2013.01); *H04L 67/20* (2013.01); *H04W 4/02* (2013.01); *H04W 4/20* (2013.01); *G06F 21/554* (2013.01); *H04L 2463/102* (2013.01)

(58) Field of Classification Search
CPC .................... G06F 21/554; H04L 2463/102
USPC ......................................................... 705/38
See application file for complete search history.

(56) References Cited

U.S. PATENT DOCUMENTS

| | | | | |
|---|---|---|---|---|
| 7,503,489 | B2 * | 3/2009 | Heffez | G06Q 20/32 235/380 |
| 7,689,504 | B2 * | 3/2010 | Warren | G06Q 20/10 705/38 |
| 7,847,686 | B1 | 12/2010 | Atkins et al. | |
| 8,140,403 | B2 | 3/2012 | Ramalingam et al. | |
| 8,145,357 | B2 * | 3/2012 | Nibler | G05B 15/02 340/505 |
| 8,176,077 | B2 * | 5/2012 | Stevens | G06F 17/3087 707/782 |
| 8,494,560 | B2 | 7/2013 | Parker | |

(Continued)

OTHER PUBLICATIONS

Billman, B. J. (1401). Systems and methods for evacuation card Retrieved from http://dialog.proquest.com/professional/docview/1494349981?accountid=142257 on Sep. 13, 2016.*

*Primary Examiner* — Kito R Robinson
(74) *Attorney, Agent, or Firm* — Perkins Coie LLP

(57) ABSTRACT

The location of a user is obtained and, based on the location of the user and services available to, or requested by the user, a notification handler sends appropriate notifications to the user.

31 Claims, 6 Drawing Sheets

(56) References Cited

U.S. PATENT DOCUMENTS

| | | | |
|---|---|---|---|
| 8,666,841 B1* | 3/2014 | Claridge | G06Q 20/4016 705/26.1 |
| 8,958,854 B1* | 2/2015 | Morley | H04B 1/38 370/311 |
| 2002/0130176 A1* | 9/2002 | Suzuki | G06Q 20/02 235/380 |
| 2003/0074310 A1* | 4/2003 | Grovit | G06Q 20/00 705/39 |
| 2003/0126064 A1* | 7/2003 | Foran | G06Q 20/02 705/37 |
| 2003/0224762 A1* | 12/2003 | Lau | G06Q 10/109 455/412.2 |
| 2004/0137929 A1* | 7/2004 | Jones | H04N 21/6582 455/517 |
| 2004/0143539 A1* | 7/2004 | Penney | G06Q 40/00 705/37 |
| 2004/0188515 A1* | 9/2004 | Jimenez | G06Q 20/342 235/380 |
| 2005/0209938 A1* | 9/2005 | Czyzewski | G06Q 20/227 705/30 |
| 2006/0041504 A1* | 2/2006 | Howard | G06Q 20/04 705/38 |
| 2006/0122921 A1* | 6/2006 | Comerford | G06Q 30/02 705/35 |
| 2006/0237531 A1* | 10/2006 | Heffez | G06Q 20/32 235/382 |
| 2007/0055672 A1* | 3/2007 | Stevens | G06F 17/3087 |
| 2007/0162382 A1* | 7/2007 | Lesniak | G06Q 20/04 705/39 |
| 2007/0250920 A1* | 10/2007 | Lindsay | G06F 21/31 726/7 |
| 2007/0294164 A1* | 12/2007 | Wilhelm | G06Q 40/02 705/38 |
| 2008/0109370 A1* | 5/2008 | Moshir | G06F 21/35 705/64 |
| 2008/0139245 A1* | 6/2008 | Huh | G06Q 10/109 455/556.2 |
| 2009/0033515 A1* | 2/2009 | Cavanaugh | H04W 4/02 340/8.1 |
| 2009/0119202 A1* | 5/2009 | Dumas-Brown | G06Q 20/10 705/38 |
| 2009/0164363 A1* | 6/2009 | Ahlers | G06Q 20/10 705/38 |
| 2009/0213756 A1 | 8/2009 | Reddy et al. | |
| 2009/0316671 A1* | 12/2009 | Rolf | H04W 4/02 370/338 |
| 2009/0325606 A1* | 12/2009 | Farris | H04W 4/02 455/456.3 |
| 2010/0138338 A1 | 6/2010 | Hammad et al. | |
| 2010/0159902 A1* | 6/2010 | Roundtree | G06F 9/45512 455/414.1 |
| 2010/0190510 A1 | 7/2010 | Maranhas et al. | |
| 2010/0274691 A1* | 10/2010 | Hammad | G06Q 20/3221 705/30 |
| 2011/0045801 A1 | 2/2011 | Parker | |
| 2011/0057790 A1* | 3/2011 | Martin | G06Q 10/109 340/539.13 |
| 2011/0190595 A1* | 8/2011 | Bennett | A61B 1/00016 600/301 |
| 2011/0238517 A1 | 9/2011 | Ramalingam et al. | |
| 2012/0023022 A1* | 1/2012 | Carroll | G06Q 20/32 705/44 |
| 2012/0102409 A1 | 4/2012 | Fan et al. | |
| 2012/0112908 A1 | 5/2012 | Prykäri et al. | |
| 2012/0136865 A1 | 5/2012 | Blom et al. | |
| 2012/0265681 A1* | 10/2012 | Ross | G06Q 40/02 705/44 |
| 2012/0268241 A1* | 10/2012 | Hanna | G06F 21/32 340/5.52 |
| 2013/0046692 A1* | 2/2013 | Grigg | G06Q 40/00 705/44 |
| 2013/0222154 A1* | 8/2013 | Mori | G08G 1/09 340/905 |
| 2013/0262203 A1* | 10/2013 | Frederick | G06Q 30/0209 705/14.12 |
| 2014/0074483 A1* | 3/2014 | van Os | G10L 15/22 704/275 |
| 2014/0279707 A1* | 9/2014 | Joshua | G06Q 30/0283 705/400 |
| 2014/0358787 A1* | 12/2014 | Bezancon | G06Q 20/405 705/44 |
| 2015/0235309 A1* | 8/2015 | Malhotra | G06Q 20/34 705/35 |

* cited by examiner

METHOD AND APPARATUS FOR PROACTIVE NOTIFICATIONS BASED ON THE LOCATION OF A USER

CROSS REFERENCE TO RELATED APPLICATIONS

This application claims priority to U.S. provisional patent application Ser. No. 61/694,451, filed Aug. 29, 2012, which application is incorporated herein in its entirety by this reference thereto.

BACKGROUND OF THE INVENTION

Technical Field

The invention relates to field of customer relationship management. More particularly, the invention relates to enhancing the customer experience by providing notifications to the customer based on the location of the customer.

Description of the Background Art

Location based services are widespread in their use and application. Such services are provided to users based on the user's current location. However, these location-based services currently depend on the user initiating the service. User initiation may be in the form of the user sending a notification to the network, e.g. in the form of a call, SMS, and so on. User initiation may also be in the form of the user operating an app present on a user's device, where the app performs various actions and/or receives notifications based on the current location of the user.

SUMMARY OF THE INVENTION

Embodiments of the invention herein disclosed provide a method and apparatus for enhancing the user experience by automatically providing notifications to the user based on the location of the user.

DETAILED DESCRIPTION OF THE INVENTION

Embodiments of the invention herein disclosed provide a method and apparatus for enhancing the user experience by automatically providing notifications to the user based on the location of the user.

Figure 1:
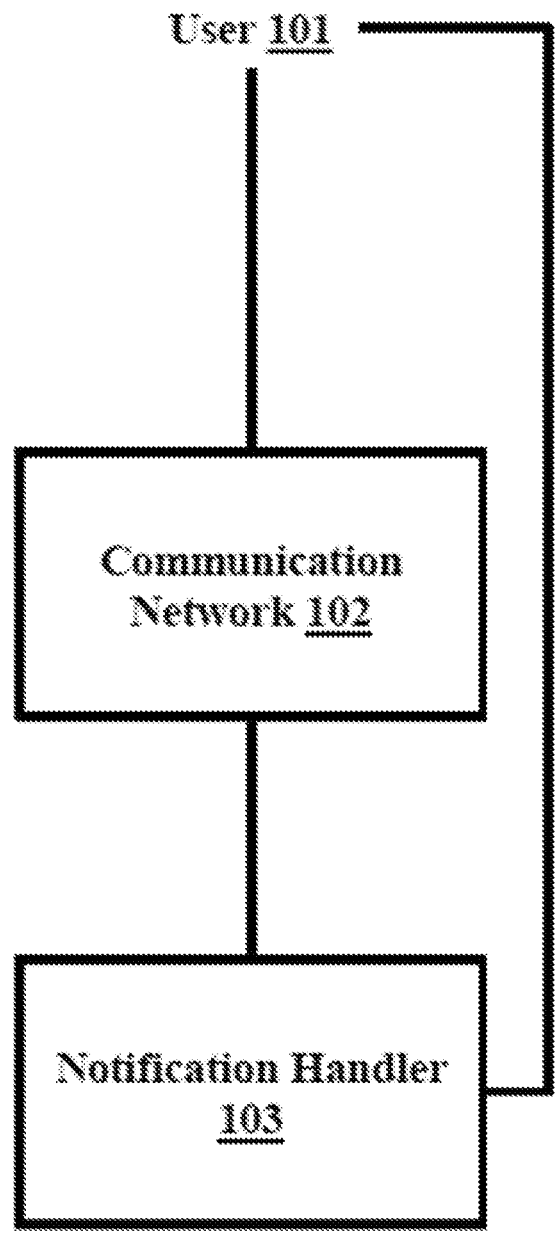
FIG. 1 is a block schematic diagram showing a system for sending notifications to a user based on the current location of the user according to the invention.

FIG. 1 is a block schematic diagram showing a system for sending notifications to a user based on the current location of the user. In an embodiment of the invention, the system comprises a communication network 102 and a notification handler 103. The communication network 102 may be a cellular-based communication network, in which a user 101 operates a user device to access the communication network 102. The user device may be, for example, a mobile phone, a handheld device, a tablet, a computer, or any other device capable of communicating with the communication network 102. The communication network 102 may use any suitable mobile communication technology to communicate with the user 101 via the user device.

The notification handler 103 obtains the location of the user 101. The notification handler 103 may obtain the location of the user 101 using a global positioning system (GPS), or other technique with which the user device detects the location of the user and provides such location information to the notification handler 103. The location of the user may be determined by an app that is running on the user device. A telecommunications provider may provide the app, or a user may obtain the app from an online app store, for example. The app may work independently or in coordination with systems operated by the telecommunications provider.

In another embodiment of the invention, the communication network 102 obtains the location of the user 101 by one or more other techniques, such as triangulation and so on, and communicates the location of the user 101 to the notification handler 103. The triangulation may be based on a variety of wireless or communications techniques, including for example WiFi, Bluetooth, 3G, 4G, LTE, and so on. Triangulation may be determined by a combination of wireless techniques in coordination with an app on the user device. In some embodiments of the invention, location may be based on an Internet protocol (IP) address. Based on the location of the user 101 and services that are available to and/or requested by the user 101, the notification handler 103 sends appropriate notifications to the user 101.

The user 101 may select one or more notification settings, where the notification settings control how a user receives notifications. The settings may refer to alerts and notifications referring to fraud alerts, reservations, attractions and cultural events, discounts and other offers, and so on. The user may select notification settings using an app on the user's device, using a Web interface to the settings, and so on. The app and/or the website may be provided by a telecommunications provider, obtained from an online app store, and so on. The user selectable settings permit the user to choose which notifications to receive, the frequency of notifications, the timing of notifications, and so on. For example, the settings may enable or disable the sending of notifications based on the type of notification. The settings may be dependent on the location of a user device, whether the user device is moving or not, and if so, at what speed. The settings may be based on other information about the user, such as calendar entries, travel itinerary, To-Do list, and so on. The settings may allow the user to choose how notifications are to be sent to the user device. For example, the user may select to receive notifications via email, SMS, automated telephone call, and so on. The settings may allow the user to receive alerts by a flashing indicator, LED, sound, and so on. The settings may include privacy settings. The privacy settings may allow the user to select which apps and/or websites may use his location information to send alerts and notifications. The privacy settings may grant or deny to third parties location information about the user.

The sending of notifications may be accomplished using an automated process, in which the notification handler 103 may set the notifications based on the user settings. In other embodiments of the invention, the instructions to send the notifications may be set by an external authority, such as the government, police, health and safety, and so on, where such instructions may be public service notifications, public safety notifications, and so on. For example, if the current location of the user 101 is detected to be a particular road on which there is a traffic block two miles ahead, then a notification may be sent to the user 101 warning of the block and advising the user to look for an alternate route, and even suggesting such route. Similarly, if the current location of the user 101 is detected to be in the vicinity of a public safety, public health, or law enforcement event, then a notification is sent to the user 101, e.g. the user is sent Amber alerts, severe weather warnings, public safety alerts, and so on. The notifications may be received in the form of email, SMS, automated telephone call, and so on. A flashing indicator, LED, or a special sound may indicate the alerts. In some embodiments, the receiving of notifications is based on a subscription.

In another embodiment of the invention, the user 101 may set the notifications. An example user interface (UI) for settings is described below in connection with FIG. 4A. In an example, the notification may be related to a security feature, where an alert is sent to the user 101 if the location of a transaction, or trigger event, performed on a credit card or debit card of the user 101 does not match the current location of the user 101.

A host may send a message, e.g. an alert or notification, to the user device along with the location of the trigger event. The app on the user device may process the message and correlate the location of the trigger event with the location of the user's device. If the location of the trigger event and the location of the user's device do not match, then an alert or notification is sent. A transaction that causes a trigger event may occur as a result of an online transaction, for example, in which case the user may acknowledge the notification and confirm that the transaction is legitimate. Similarly, a high frequency of transactions, whether co-located with the user device or not, may cause a security notification to be sent to the user. If the user does not respond to the alert or notification, or declines the transaction which caused the trigger event, then the card may be flagged for fraud, placed on a so-called hot list, or otherwise listed as having a potential problem.

In another embodiment of the invention, the notification may be set by the user to modify the settings of the user's device, such as the data limits and so on, or a notification may be sent to the user reminding the user to modify his device when the user 101 is detected to be roaming, i.e. when the location of the user 101 is outside the operating circle of the user's home network. An example user interface for alerts and notifications settings is described below in connection with FIG. 4A.

In another embodiment of the invention, the present status of travel of the user, i.e. the location of the user 101, and any reservations made by the user 101, such as hotels, airplanes, trains, rental cars, restaurants, cultural events, etc., can be mapped and appropriate notifications may be sent to the user if it is determined that the user 101 may miss a related time limit, such as a check-in time at a hotel based on the reservation, a check-in time at the airport for a flight, and so on. The receipt of alerts or notifications about check-in times may be user selectable, based on default or recommended options. Information regarding any reservations made by the user may be obtained using a variety of techniques, including using a purpose-built application or cooperating with other applications on the user device. For example, travel information may be obtained from a travel app, from a calendar app on a user device, by communicating with a host, and so on.

Figure 2:
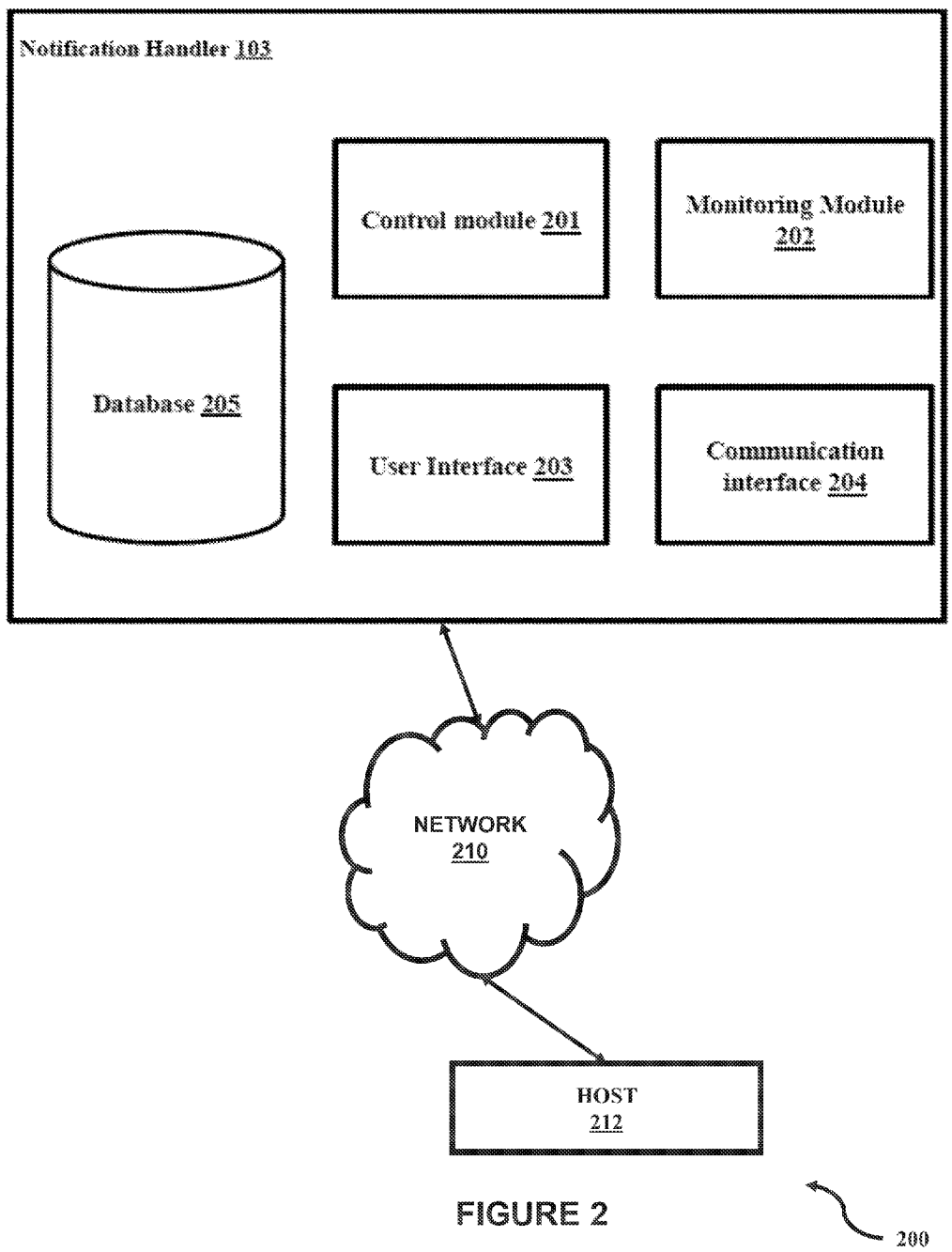
FIG. 2 is a block schematic diagram showing a notification handler according to the invention.

FIG. 2 is a block schematic diagram showing a notification handler. The notification handler 103 comprises a control engine 201, a monitoring module 202, a user interface 203, a communication interface 204, and a database 205. The notification handler 103 communicates via a network 210 with a host 212.

The network may be a wireless network which supports one or more wireless techniques, including Wi-Fi, Bluetooth, 3G, 4G, LTE, and so one. The host may include an interface with the user device. The host may interact with an app on a user device and the notification handler 103. The host may provide the notifications to be sent to the user.

The monitoring module 202 obtains the location of the user 101, for example by using GPS, via the communication interface 204, where the user device detects the location of the user and informs the notification handler 103 of the user's location. The location of the user may be provided by a persistent application on the user device, or it may be provided in cooperation with a telecommunications provider. In another embodiment of the invention, the communication network 102 obtains the location of the user 101 by any other suitable technique, such as by triangulation, and so on, and communicates the location of the user 101 to the monitoring module 202 via the communication interface 204.

Figure 4A:
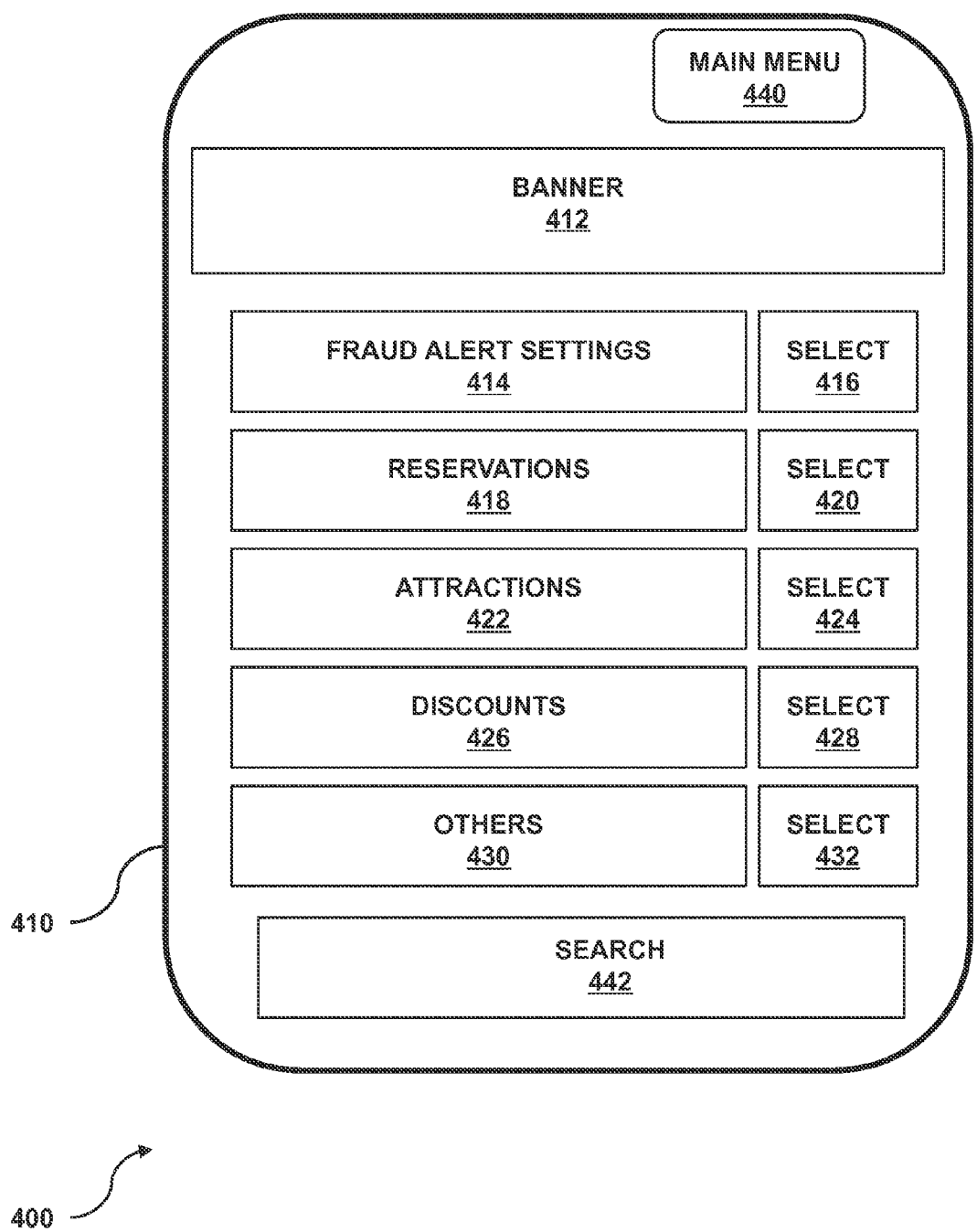
FIG. 4A is an example screen shot of user settings according to the invention.

The monitoring module 202 informs the control engine 201 of the current location of the user 101. The control engine 201 checks for notifications that are to be sent to the user based on the current location of the user 101 and the notification settings, as set by the user 101 and/or any other authority. The control engine 201 may access the notification settings from the database 205. An example of the user settings UI is shown in FIG. 4A below. Based on the above, the control engine 201 sends appropriate notifications to the user 101 via the communication interface 204. The control engine 201 may fetch the notifications from the database 205 or from any other identified source.

The sending of notifications may be an automated process, for example where an authority such as the government, police, and so on, sets the notifications via the user interface 203. In this example, such notifications may be public service notifications and the like. The authority may also set the format of the notification, the conditions for sending the notifications, and so on, via the user interface 203.

The user may set notification preferences using an app on the user's mobile device, or the user may set notification preferences using a website. For example, the user may choose to receive the automated notifications or to block them. The settings may be part of a notification subscription service. The notifications and associated conditions are stored in the database 205.

In another embodiment of the invention, the notifications may be configured by the user 101 via the user interface 203. An example user interface for settings is shown in FIG. 4A below. The user 101 may set the format of the notification, the conditions for sending the notifications, and so on, via the user interface 203. The settings may include notification preferences regarding which notifications are to be received. The notifications may include fraud alerts, traffic condition alerts, roaming network alerts, attraction alerts, special offer alerts, and so on. The settings may include turning notifications on and off, selecting the frequency of notifications, selecting the timing of notifications, and so on. The user may choose the mode by which alerts and notifications are received, for example by SMS, email, automated telephone calls, by flashing indicator, by played special sound, and so on. The notifications and associated conditions are stored in the database 205.

The host 212 may send alerts, notifications, messages, and so on, to the user's device for a variety of purposes. For example, the host 212 may send a message along with location information related to a trigger event. A client app on the user's device processes the trigger message and correlates the message with the location of the trigger event and the location of the user's device. If a match is not made, then the host sends an alert or notification to the user about a potential problem with a purchase. Similarly, the host may indicate to a user a trigger event relating to some time-based event, including flight check-in time, hotel check-in time, and so on. The user device processes the trigger, determine the user device's current location, and send an alert or notification to the user about the impending check-in time, for example.

Figure 3:
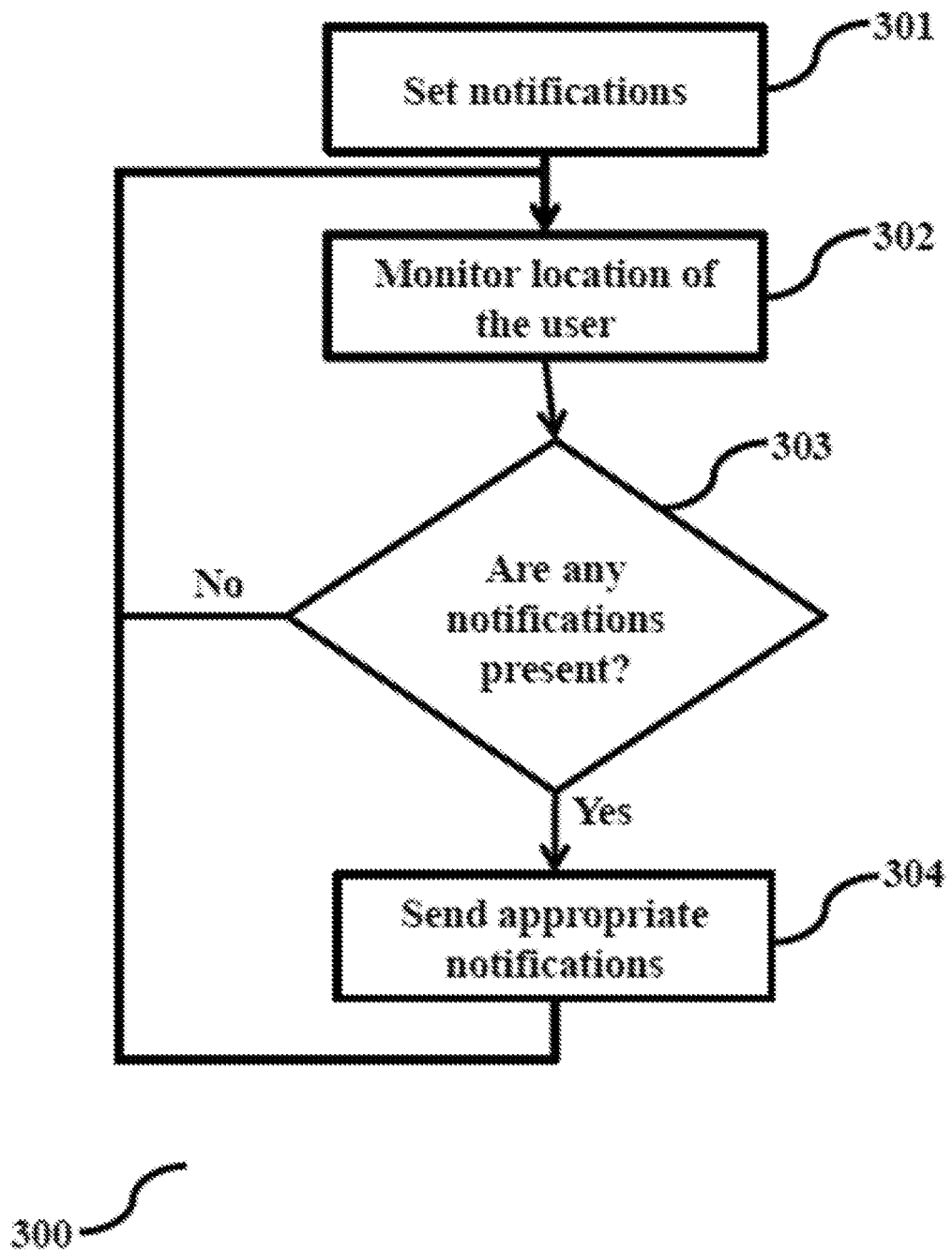
FIG. 3 flowchart depicting a method for sending notifications to a user based on the current location of the user a according to the invention.

FIG. 3 is a flowchart depicting a method (300) for sending notifications to a user based on the current location of the user. The notification handler 103 enables (301) notifications to be set. The notifications may set by the user 101 or any authority, such as the government, police, and so on, where such notifications may be public service notifications and the like. The format of the notification, the conditions for sending the notifications, and so on may also be set. The notification handler 103 monitors (302) the location of the user 101. The notification handler 103 may obtain the location of the user 101 using GPS, where the user device detects the location of the user and then informs the notification handler 103 of the user's location.

In another embodiment of the invention, the communication network 102 obtains the location of the user 101 using any other suitable technique, such as triangulation, and so on, and communicates the location of the user 101 to the notification handler 103. Based on the location of the user 101 and services available to, or requested by the user 101, the notification handler 103 checks (303) for notifications to be sent to the user 101 and, if there are notifications to be sent to the user 101, the notification handler 103 sends (304) the appropriate notifications to the user 101. Those skilled in the art will appreciate that the various actions depicted in the method (300) of FIG. 3 may be performed in the order presented, in a different order, or simultaneously. Further, in some embodiments of the invention, some of the actions shown in FIG. 3 may be omitted.

In another embodiment of the invention, an application (app) may be present in the user device, with which the user can configure notifications, associated settings, and so on. The application informs the user of the notifications, depending on the configuration set by the user and/or conditions detected by the application. In this embodiment of the invention, the user device performs all of the functions that are otherwise performed by the notification handler, as described above.

Embodiments of the invention may be used for fraud alerts, fraud prevention, and/or fraud resolution based upon location awareness. This aspect of the invention reduces the authentication burden placed upon the user by applying a combination of location services and biometric data, e.g. fingerprint, voiceprint, facial picture and/or recognition, etc. For example, a user may wish to make a purchase at a point of sale that is co-located with the user's registered device. An alert may be sent to the user via the user's preferred mode of communication, indicating that the user may confirm the purchase and provide additional identifying information, such as answering a secret question, scanning a finger on the device screen, capturing an image of the user's face using the device's camera, and so on. The validation of biometric and other data provided by the user may be performed using an app on the user's device, by a remote host, and so on.

Further, if the location of the user device is coincident with a detected point-of-sale location, a notification, alert, and/or SMS request for further authentication may be triggered. Embodiments of the invention can associate the location of a credit card transaction or ATM transaction by a user with the user's location. A fraud alert system based on this information uses appropriate algorithms to trigger an alert or notification. For example, when the transactions are clustered in real time based on location, an alert may be triggered if the density of transactions is beyond a set threshold for the user's location. Similarly, the frequency of transactions that occur, whether clustered or not, may trigger an alert or notification.

In another embodiment of the invention, the credit limit or daily purchase limit of a user may be increased using location awareness. Typically, credit limit increases cannot be performed automatically without customer approval but, if a credit limit is exceeded at point-of-sale, and the location of the user device matches the point-of-sale location, the user is notified and asked for approval of credit limit increase. For example, a user may have requested a certain credit limit to reduce or control risk while on a planned trip. The credit limit may be quickly approached due to routine travel expenses. The user may then wish to make a purchase which exceeds the credit limit. In such case, an alert or notification is sent to the user warning of the impending credit limit and offering a credit increase. The user can approve or decline the credit limit increase. Similarly, a daily purchase limit for a debit card or a purchase card may be neared or reached. As was the case with the credit limit alert or notification, an alert or notification is sent to the user warning of the impending daily purchase limit and offering to increase that limit. The user can approve or decline the daily purchase limit increase.

Further, in embodiments of the invention one of the actions depicted in the method (300) of FIG. 3 comprises adjusting any of the individual's credit and mobile settings as required by local law or practice upon detecting travel by the individual to a different region or country. Such action can also comprise automatically providing any of notifications, alerts, and SMS messages to the individual to assist the individual in changing the device settings as required by local law or practice.

Another embodiment of the invention uses a mobile app to adjust a user's credit card and mobile settings as required upon travel to other geographies. Any of notifications, alerts, and SMS is sent proactively to the user to help the user change the user device settings when the user travels to different countries. Similarly, based on location, the present status of travel and existing reservations, e.g. car, hotel, etc., can be synchronized and appropriate options provided in case of delays, etc. The mobile app may access information on the user's device, may access the database 205, and so on. Information about particular countries may be stored with other data within the database, it may be stored in a foreign country module in the database, or it may be stored in the mobile app.

Embodiments of the invention also enable, for example, enhanced outbound calls, notifications, and/or alerts based on user location, movement, and time information, e.g. the user's current location, velocity of location changes, such as when the user is driving versus when the user is walking, etc.

FIG. 4A is an example user interface (UI) showing user settings for alerts and notifications 400. The UI 410 may be included in an app stored on the user's device, may be displayed by a website, and so on. The UI 410 may include various banners and buttons. Any number of banners and/or buttons appropriate to user settings may be included. The user settings UI may include a banner 412. The banner may include, for example, information indicating the purpose of the UI, e.g. notification settings, welcome messages, and so on. The banner may include company information, special alerts, special offers, and so on. The UI 410 may include a series of buttons for selection of various settings and may include buttons to access one or more individual settings. Select buttons may be used to turn on, and to turn off, alert and notification options. The buttons may be used to select menus of options for alert and notification configuration. For example, a UI may present one or more select buttons 416, 420, 424, 428, and 432. The select buttons may be used in combination or individually. The select buttons may be used to turn on, turn off, and configure alerts and notifications for their related settings buttons. For example, the select button 416 may select (turn on), deselect (turn off), and configure alerts and notifications relating to fraud 414. The select button 420 may select, deselect, and configure alerts and notifications relating to reservations 418; select button 424 may select, deselect, and configure alerts and notifications relating to roaming 422; select button 428 may select, deselect, and configure alerts and notifications relating to attractions and cultural events 426; select button 432 may select, deselect, and configure alerts and notifications relating to other categories 430, and so on. The others button 430 may display another list of selecting and setting options.

Individual preferences may be set for each type of alert and notification. For example, fraud settings 414 may display a list of preferences and settings relating to fraud. Fraud settings may include the number and frequency of alerts and notifications, permissible times for receiving alerts and notifications, and so on. The UI 410 may include control buttons. For example, the UI 410 may include a main menu button 440 which when pressed, returns the user to the main app screen. The UI 410 may also include a search button 442 which when pressed, assists the user in finding settings of interest, for example.

Figure 4B:
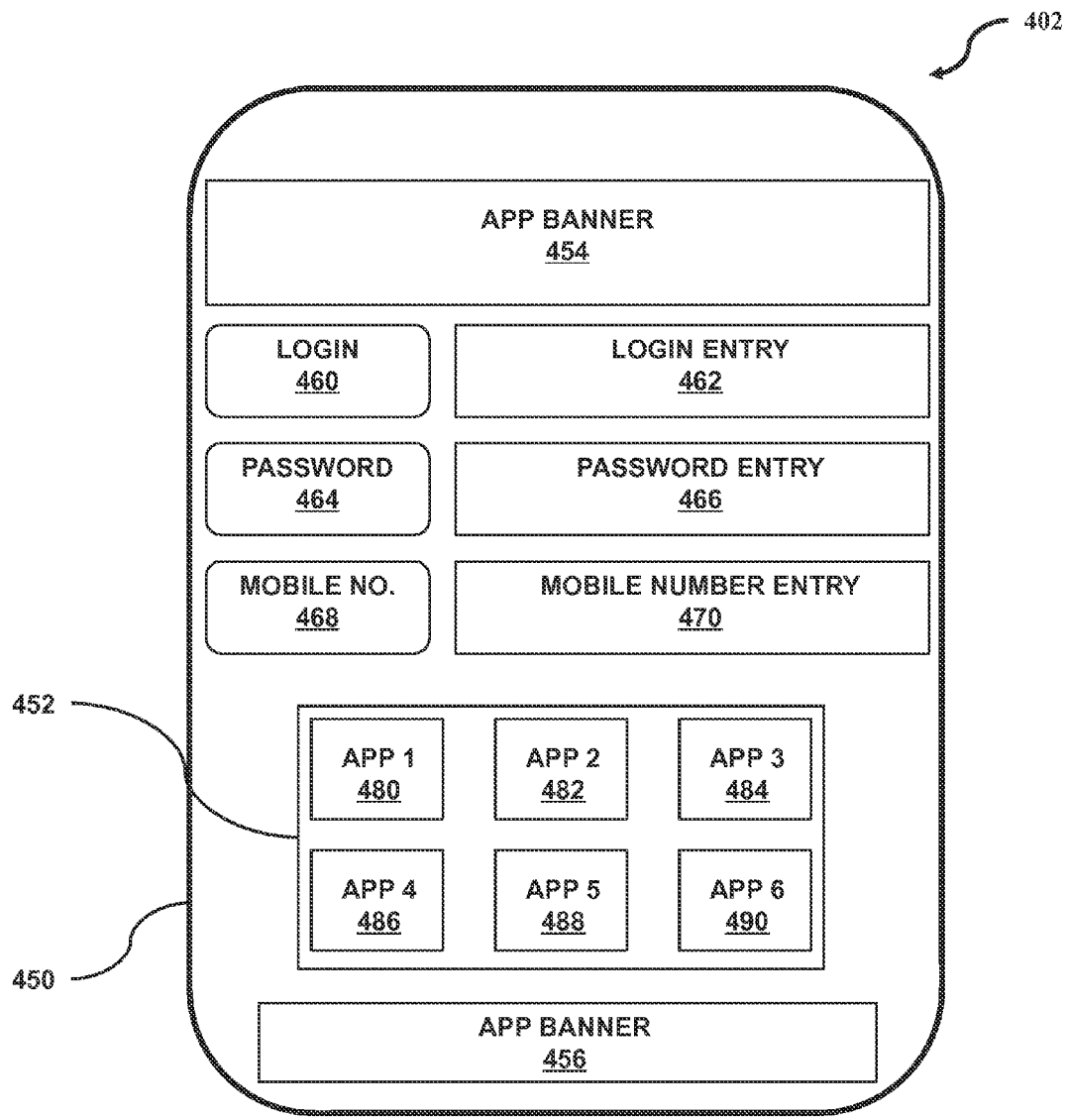
FIG. 4B is an example screen shot showing access to various apps according to the invention.

FIG. 4B is an example showing a user app for making or receiving alerts and notifications 402. The UI 450 may be included in an app stored on the user's device, may be displayed by a website, and so on. The UI 450 may include various banners and buttons. The UI 450 may include a login screen, selection and configuration screens, buttons, menus, preferences, and so on. The UI may include app banners displayed on a screen of a user device. For example, UI 450 may include an app banner 454 and an app banner 456. Alerts can be shown in the app banner 454, the app banner 456, or elsewhere on the UI 450. The app banners may include company logos, welcome messages, offers, help information, and so on. The app banners may be user selectable or may be permanent parts of the UI 450.

The UI 450 may include a series of buttons and a series of data entry windows. For example, in the case of a login screen, the UI may include buttons for selecting and gathering various unique information about the user, such as a login name 460, a password 464, a mobile telephone or device number 468, and so on. For each UI button, a data entry field may be included. For example, for the login button 460, a login entry box 462 may be included. Similarly, for the password button 464, a password entry box 466 may be included, and for the mobile number button 468, a mobile number entry box 470 may be included. For each entry box, 462, 466, and 470, for example, the user may enter relevant data. The data may include alphanumeric data, biometric data, video data, and so on. The alphanumeric data may be entered by a keyboard, on-screen keyboard, voice recognition techniques, and so on.

The UI 450 may include any number of additional apps 452 that can be accessed. The apps may be selectable in 452 by choosing an app icon, app 1 480, app 2 482, app 3 484, app 4 486, app 5 488, and app 6 490. The example app for UI 450 may control alert notifications for these other apps. The included apps may refer to social apps, communications apps, financial apps, travel apps, and any other appropriate apps. Selecting an app may connect a user to the app, service, webpage, and so on, indicated by the app button or icon. For example, one or more apps may include social apps. Choosing a social app, for example, may be useful for gathering suggestions or for making recommendations. For example, a user who is traveling may ask for suggestions about points of interest, attractions, and cultural events available in the city or country they are visiting. Additionally, a user may make recommendations for sights to see and things to do, or not do, while traveling.

Computer Implementation

Figure 5:
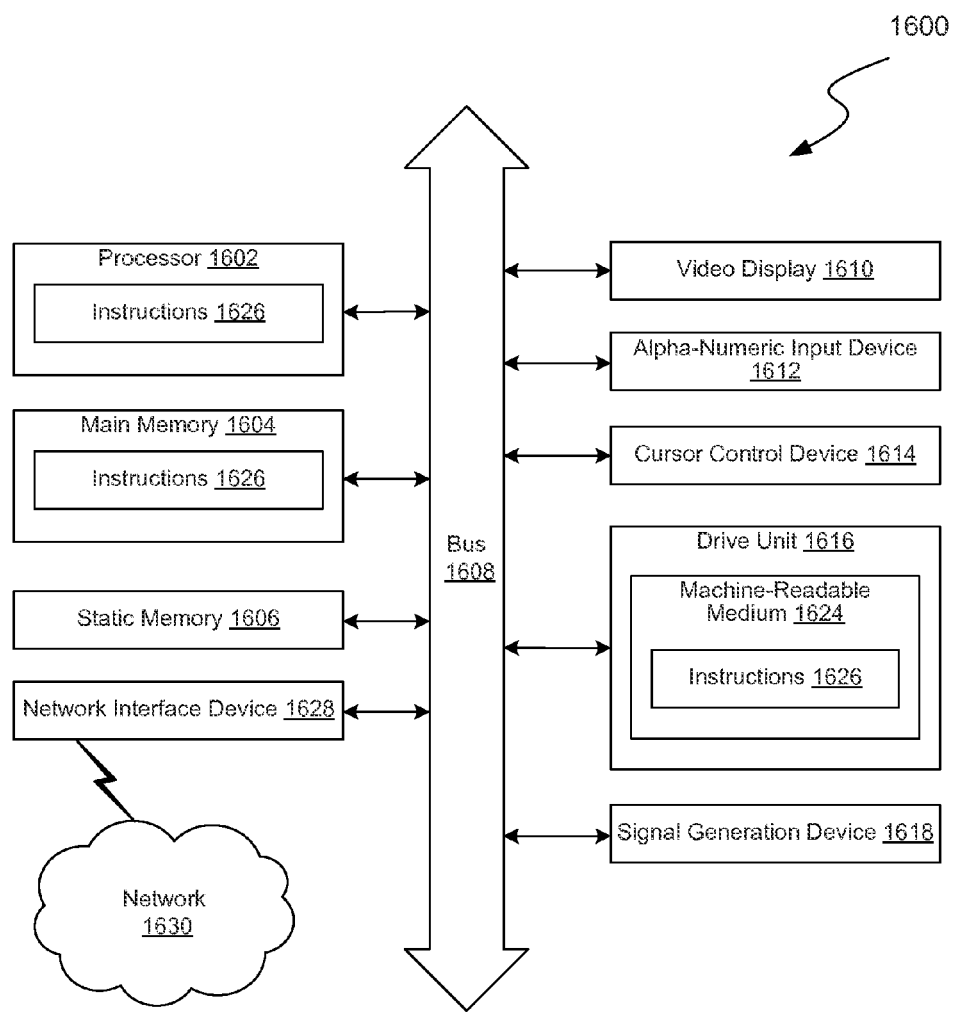
FIG. 5 is a block schematic diagram that depicts a machine in the exemplary form of a computer system within which a set of instructions for causing the machine to perform any of the herein disclosed methodologies may be executed.

FIG. 5 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604, and a static memory 1606, which communicate with each other via a bus 1608. The computer system 1600 may further include a display unit 1610, for example, a liquid crystal display (LCD). The computer system also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC). Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core, such as the CPU of a computer, or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for effecting an autonomous, location-based action vis a vis an individual, comprising:
   detecting, by a computing system, an individual's location with a device associated with said individual and without any interaction on the part of said individual with said device at a time of performing said detecting; and
   when said individual's location is determined to be coincident with or proximate to a location for which an action is to be triggered upon detection of said individual being coincident with or proximate to said location, causing the computing system to automatically take at least one action and one further action relative to said individual via said device; wherein said action comprises automatically modifying said device settings in a manner predetermined by said individual when the location of said individual is determined to be outside of an operation range of said individual's home network;
   wherein said further action comprises any of:
      retrieving a credit limit of the said individual that is set by the individual for the location; determining that the credit limit is exceeded at a transaction location, and the location of said device is coincident with said transaction location;
      sending a notification requesting approval for an increase in said credit limit to the device; receiving a response to the notification from the device, the response including an approval or a rejection for the increase in said credit limit; and
      adjusting, based on the response, any of said individual's credit and device settings as required by local law or practice upon detecting travel by said individual to a different region or country.

2. The method of claim 1, further comprising:
based on a current location of said individual, said action comprising at least sending at least one notification to said individual, which notification is received at said device.

3. The method of claim 1, further comprising:
providing a communication network for exchanging location information and actions between said device and a notification handler.

4. The method of claim 3, wherein said communication network comprises a cellular-based communication network.

5. The method of claim 1 wherein said device comprises any of a mobile phone, a handheld device, a tablet, and a computer.

6. The method of claim 1, further comprising:
detecting said individual's location using any of a global positioning system (GPS) and a triangulation system.

7. The method of claim 1, further comprising:
providing a notification handler for setting and automatically providing at least one notification to said individual.

8. The method of claim 7, further comprising:
an external authority sending instructions to said notification handler;
responsive thereto, said notification handler sending at least one notification to said individual when said individual's location coincides with, or is proximate to, a location that is relevant to said instructions.

9. The method of claim 8, wherein said external authority comprises any of a government agency and a police organization.

10. The method of claim 8, wherein said instructions comprise public service notifications.

11. The method of claim 7, further comprising:
said notification handler determining that a current location of said individual is along a route that is currently subject a traffic block; and
said notification handler sending a notification to said individual warning of said traffic block and, optionally, advising said individual with regard to an alternate route.

12. The method of claim 1, further comprising:
providing a user interface associated with said device, said user interface providing a facility with which said individual sets at least one action and at least one trigger for said action.

13. The method of claim 1, further comprising:
said action comprising sending an alert to said individual when the location of a financial transaction related to said individual is performed at a location that does not coincide with a current location of said individual.

14. The method of claim 1, further comprising:
determining a present status of travel of said individual based upon a current location of said individual relative to one or more time limited travel arrangements made by said individual; and
said action comprising automatically sending at least one notification to said individual when it is determined that said individual may miss one or more time limited travel arrangements.

15. The method of claim 7, further comprising:
configuring said notification handler to provide a control engine, a monitoring module, a user interface, a communication interface, and a database;
said monitoring module obtaining the location of said individual from said device via said communication interface and informing said control engine of a current location of said individual;
said control engine checking for notifications that are to be sent to said individual based on the current location of said individual and notification settings, as set by any of said individual and any other agency with said user interface, said control engine accessing said notification settings from said database and sending at least one notification to said individual via said communication interface.

16. The method of claim 1, further comprising:
providing a user interface for setting said at least one action, a format for said at least one action, and conditions for taking said at least one action.

17. The method of claim 7, further comprising:
implementing said notification handler in an application that is present in said device;
said individual using said application for configuring notifications and associated settings; and
said application automatically informing said individual of said notifications, depending upon any of a configuration set by said individual and conditions detected by said application relative to said individual's location.

18. The method of claim 1, further comprising:
said action comprising implementing any of a fraud alert, a fraud prevention method, and a fraud resolution method based upon said individual's location.

19. The method of claim 18, further comprising:
said action comprising requesting and capturing biometric data from said individual; and
combining information concerning said individual's current location with said biometric data to authenticate a transaction.

20. The method of claim 1, further comprising:
determining when said individual's location, based upon said device location, is coincident with a detected transaction location; and
said action comprising triggering any of a notification, alert, and SMS request for further authentication of said individual.

21. The method of claim 1, further comprising:
determining when said individual's location, based upon said device location, is coincident with a detected transaction location; and
said action comprising triggering any of an alert and notification when a plurality of transactions are clustered in real time based on location if the density of said transactions exceeds a predetermined threshold for said individual's determined location.

22. The method of claim 1, further comprising:
said action comprising automatically providing any of notifications, alerts, and SMS messages to said individual to assist said individual in changing said device settings as required by local law or practice.

23. The method of claim 1, further comprising:
said action comprising automatically synchronizing current status of said individual's travel with said individual's existing reservations.

24. The method of claim 1, further comprising:
said action comprising enhancing any of outbound calls, notifications, and alerts based on a combination of said individual's location, movement, and time information.

25. An apparatus for effecting an autonomous, location-based action vis a vis an individual, comprising:
a processor configured for detecting an individual's location with a device associated with said individual and without any interaction on the part of said individual with said device at a time of performing said detecting;
said processor configured for determining said individual's location to be coincident with or proximate to a location for which an action is to be triggered upon detection of said individual being coincident with or proximate to said location; and
said processor configured for automatically taking at least one action and one further action relative to said individual via said device;
wherein said action comprises automatically modifying said device settings in a manner predetermined by said individual when the location of said individual is determined to be outside of an operating range of said individual's home network;
wherein said further action comprises any of:
retrieving a credit limit of the said individual that is set by the individual for the location;
determining that the credit limit is exceeded at a transaction location, and the location of said device is coincident with said transaction location;
sending a notification requesting approval for an increase in said credit limit to the device;
receiving a response to the notification from the device, the response including an approval or a rejection for the increase in said credit limit; and
adjusting, based on the response, any of said individual's credit and device settings as required by local law or practice upon detecting travel by said individual to a different region or country.

26. The apparatus of claim 25, said processor comprising:
a notification handler comprising a control engine, a monitoring module, a user interface, a communication interface, and a database;
said monitoring module configured for obtaining the location of said individual from said device via said communication interface and for informing said control engine of a current location of said individual;
said control engine configured for checking for notifications that are to be sent to said individual based on the current location of said individual and notification settings, as set by any of said individual and any other agency with said user interface;
said control engine configured for accessing said notification settings from said database; and
said control engine configured for sending at least one notification to said individual via said communication interface.

27. An apparatus for effecting an autonomous, location-based action vis a vis an individual, comprising:
a processor configured for detecting an individual's location with a device associated with said individual and without any interaction on the part of said individual with said device at a time of performing said detecting;
said processor configured for determining said individual's location to be coincident with or proximate to a location for which an action is to be triggered upon detection of said individual being coincident with or proximate to said location;
said processor configured for automatically taking at least one action and one further action relative to said individual via said device;
wherein said action comprises automatically modifying said device settings in a manner predetermined by said individual when the location of said individual is determined to be outside of an operating range of said individual's home network;
wherein said further action comprises any of:
retrieving a credit limit of the said individual that is set by the individual for the location;

determining that the credit limit is exceeded at a transaction location, and the location of said device is coincident with said transaction location;

sending a notification requesting approval for an increase in said credit limit to the device;

receiving a response to the notification from the device, the response including an approval or a rejection for the increase in said credit limit; and adjusting any of said individual's credit and device settings as required by local law or practice upon detecting travel by said individual to a different region or country.

28. The apparatus of claim 27, wherein said action comprises requesting and capturing biometric data from said individual; and combining information concerning said individual's current location with said biometric data to authenticate a transaction.

29. The apparatus of claim 27, wherein said action comprises triggering any of a notification, alert, and SMS request for further authentication of said individual when said individual's location, based upon said device location, is coincident with a detected transaction location.

30. The apparatus of claim 27, wherein said action comprises triggering any of an alert and notification when a plurality of transactions are clustered in real time based on location if the density of said transactions exceeds a predetermined threshold for said individual's determined location when said individual's location, based upon said device location, is coincident with a detected transaction location.

31. The apparatus of claim 27, wherein said action further comprises any of:

a fraud alert, a fraud prevention method, and a fraud resolution method based upon said individual's location.

* * * * *